United States Patent [19]

Harada et al.

[11] Patent Number: 5,361,152
[45] Date of Patent: Nov. 1, 1994

[54] PROCESS FOR PRODUCING FERROELECTRIC LIQUID-CRYSTAL CELLS

[75] Inventors: Takamasa Harada, Inba, Japan; Claus Escher, Mühltal, Germany; Gerhard Illian, Tokyo, Japan; Dieter Ohlendorf, Liederbach, Germany; Heinz Rieger, Hofheim am Taunus, Germany; Norbert Rösch, Frankfurt am Main, Germany

[73] Assignee: Hoechst Aktiengesellschaft, Frankfurt am Main, Germany

[21] Appl. No.: 949,839
[22] PCT Filed: Jun. 14, 1991
[86] PCT No.: PCT/JP91/00805
§ 371 Date: Feb. 5, 1993
§ 102(e) Date: Feb. 5, 1993
[87] PCT Pub. No.: WO91/20011
PCT Pub. Date: Dec. 26, 1991

[30] Foreign Application Priority Data

Jun. 14, 1990 [JP] Japan .................... 2-156387
Apr. 8, 1991 [JP] Japan .................... 3-075341

[51] Int. Cl.⁵ .................................... G02F 1/1341
[52] U.S. Cl. ........................... 359/80; 359/81; 359/100; 430/20
[58] Field of Search ............... 359/36, 43, 80, 81, 359/90, 100; 430/20; 445/1, 24, 25; 141/1, 7

[56] References Cited

U.S. PATENT DOCUMENTS 4,691,995 9/1987 Yamazaki et al. ............... 359/80
4,917,473 4/1990 Watanabe .......................... 359/80

FOREIGN PATENT DOCUMENTS 0113064 7/1984 European Pat. Off. .
0292244 11/1988 European Pat. Off. .
61-116326 6/1986 Japan .
90/00263 1/1990 WIPO .

OTHER PUBLICATIONS

Patent Abstract of Japan, Production of Liquid Crystal Display Panel, vol. 10, (1986), S. 506.

Primary Examiner—William L. Sikes
Assistant Examiner—Tai V. Duong
Attorney, Agent, or Firm—Curtis, Morris & Safford

[57] ABSTRACT

A process for producing a liquid-crystal cell which comprises the steps of:
(a) providing a curable sealant portion in the periphey of the side of an electrode plate that has an electrode or electrodes;
(b) (i) coating a ferroelectric liquid-crystal composition on the portion surrounded by said sealant portion, with a spacer being preliminarily provided in said portion;
(ii) coating spacer-containing ferroelectric liquid-crystal composition on the portion surrounded by said sealant portion; or
(iii) coating a ferroelectric liquid-crystal composition on the portion surrounded by said sealant portion and thereafter providing a spacer over said composition;
(c) defoaming the coated layer of the liquid-crystal composition by heating during or after evacuation;
(d) placing the other electrode plate in such a way that the side of said other electrode plate which has an electrode or electrodes faces the side of said one electrode plate containing the thermally defoamed coated layer of the liquid-crystal composition and compressing the two electrode plates together; and
(e) curing said sealant.

2 Claims, 1 Drawing Sheet

PROCESS FOR PRODUCING FERROELECTRIC LIQUID-CRYSTAL CELLS

FIELD OF THE INVENTION

The present invention relates to a process for producing liquid-crystal cells using ferroelectric liquid crystals (FLC).

BACKGROUND OF THE INVENTION

Liquid-crystal cells using FLC have drawn increasing attention as elements that can be used as displays in watches, hand-held calculators, various OA (office automation) equipment and television sets. A liquid-crystal cell using FLC is currently manufactured by a process that comprises the steps of placing a pair of electrode plates in such a way that their electrode sides face each other, bonding the plates together by means of a sealant provided in the periphery to leave a central hollow portion that is to be filled with a liquid crystal, and injection FLC into the follow portion through an inlet in the sealed portion by capillary action under high-temperature and high-vacuum conditions. A problem with this method is that since the gap between the two electrode plates for the FLC liquid-crystal cell is so small (ca. 2 $\mu$m) compared to cells using conventional twisted nematic liquid crystals that it takes quite a long time for filling the cell with FLC even if pressure is applied. Further, FLC is so viscous compared to nematic liquid crystals even if it is heated for injection that defoaming (removal of air and other gases that are contained in the liquid crystal) is difficult to achieve or can only be performed unevenly. It is known from EP-A-0 292 244 to prepare liquid-crystal cells without injecting FLC by capillarity by forming a coated FLC layer on one electrode plate. However, there is no mentioning of heating for defoaming said FLC layer and to provide homogeneity in its structure. Also, FLC layer and adhesive layer are formed on different electrodes according to EP-A-0 292 244.

SUMMARY OF THE INVENTION

The present invention has been accomplished under these circumstances on the basis of the finding that excellent liquid-crystal cells for use of ferroelectric liquid crystals can be produced by combining the following two techniques, i.e., preliminarily forming a coated FLC layer on electrode plates without injecting FLC by capillarity, and heating said coated FLC layer for deforming and to provide homogeniety in its structure.

The present invention relates to a process for producing a liquid-crystal cell which comprises the steps of:
(a) Providing a curable sealant portion in the periphey of the side of an electrode plate that has an electrode;
(b)
  (i) coating a ferroelectric liquid-crystal composition on the portion surrounded by said sealant portion, with a spacer being preliminarily provided in said portion; or
  (ii) coating spacer-containing ferroelectric liquid-crystal composition on the portion surrounded by said sealant portion; or
  (iii) coating a ferroelectric liquid-crystal composition on the portion surrounded by said sealant portion and thereafter providing a spacer over said composition;
(c) defoaming the coated layer of the liquid-crystal composition by heating the coated plate during or after evacuation up to the temperature at which the liquid-crystal composition exhibits an isotropic liquid or nematic phase;
(d) placing the other electrode plate in such a way that the side of said other electrode which has an electrode faces the side of said one electrode containing the thermally defoamed coated layer of the liquid-crystal composition and compressing the two electrode plates together; and
(e) curing said sealant.

BRIEF DESCRIPTION OF THE DRAWINGS

FIGS. 1a–1c show schematically the major steps of the process of the present invention, in which FIG. 1a and 1b are plan views and FIG. 1c is a perspective view.

DETAILED DESCRIPTION

In step (b), the spacer can be provided by one or more of the following methods:
i) the spacer is sprayed before the composition is coated;
ii) the composition containing the spacer is coated form a layer that contains it;
iii) the spacer is sprayed over the coated layer of the composition;
iv) a photosensitive resin layer is provided on the electrode plate and partially exposed to light, followed by development of the exposed or non-exposed area to form a spacer (directly), which is then coated with the composition (the photosensitive resin may be positive-type or negative-type action); and
v) the surface of the substrate which is typically made of glass is partially etched to form a spacer (directly) and the composition is subsequently coated.

The purpose of providing the spacer is to provide a cell of uniform thickness.

Methods i) and iii) may be implemented by either a wet system (using Freon gases as a carrier) or a dry system (dusting air).

In method iv), either positive-type or negative-type photoresists can be used as photosensitive resins. An example of the positive-type photosensitive resins is AZ 1300 SF of Hoechst AG and an example of the negative-type photosensitive resins is OZATEC NL 143 of Hoechst AG. The photosensitive resin is coated in a thickness of 0.5–10 $\mu$m, preferably 1.5–3 $\mu$m, as measured after development.

Except in method iv), the spacer has a diameter of 0.5–10 $\mu$m, preferably 1.5–3 $\mu$m, and may be made of an inorganic material such as silicon oxide, or a polymer selected from among acrylic resins and epoxy resins. The shape of the spacer is not limited in any particular way and it may be in the form of a true sphere, a rod, a prism, etc., with a true spherical shape being preferred. The spacer is used in an amount of 0.1–10 wt %, preferably 1–5 wt %, of the total amount of the composition.

The preferred embodiment of the present invention is described below in greater detail with reference to the accompanying drawings.

Figure 1A:
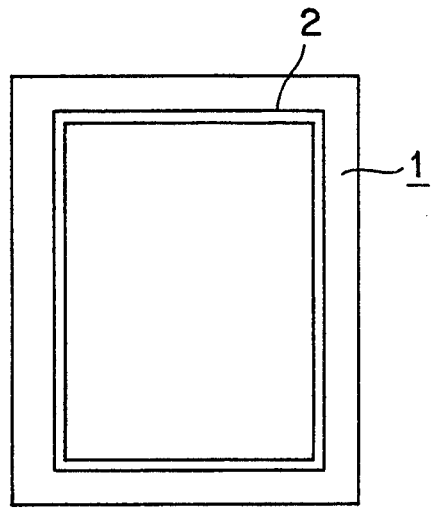
Figure 1B:
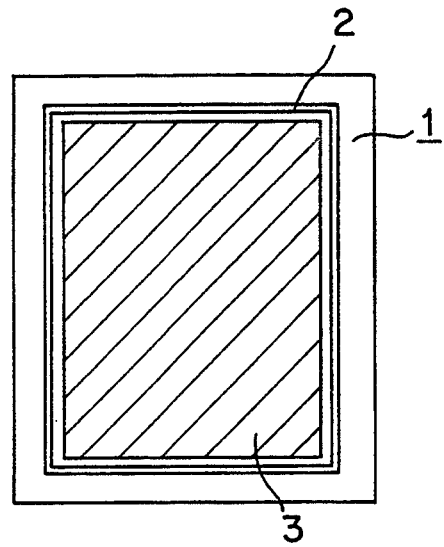

A glass or plastic plate is used as the electrode plate and a transparent electrode such as ITO is provided on one side of the plate. The electrode on one of the electrode plates that make up a cell may be opaque. The side of each electrode plate which has an electrode is overlaid with an alignment film made of a polymer coat such as polymide or polyamide or an inorganic coat such as silicon oxide. As shown in FIG. 1a, a curable sealant such as a uv curable sealant (e.g. epoxy resin) or low-temperature (heat) curable sealant (e.g. epoxy resin that cures at ca. 100°-150° C.) is screen printed onto the periphery of the side of an electrode plate 1 that includes an electrode (not shown), whereby a sealant portion 2 is provided. Then, as shown in FIG. 1b, FLC composition containing a spacer is printed (e.g. by intaglio), roll coated or otherwise applied to the portion surrounded by the sealant portion 2, so as to form a coated layer of FLC composition 3. The FLC composition may be composed of ingredients in various combinations. To prepare the composition, a basic formulation consisting of the following eight components (their contents shown in mol %) is first provided:

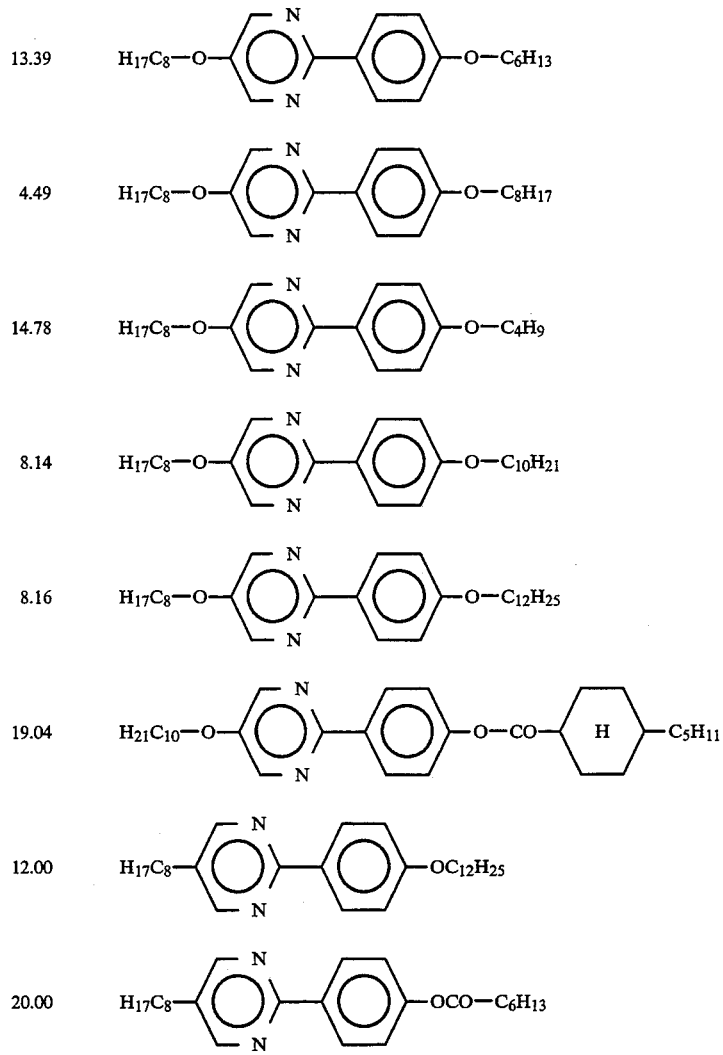

This basic formulation undergoes the following phase transfer:

$S_C 71 S_A 78 N 93 I$

Chiral dopants may be added to this basic formulation and the following are examples of the compounds that can be used as chiral dopants:

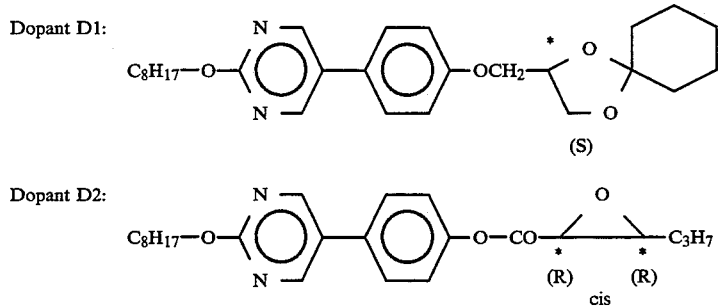

Dopant D3:

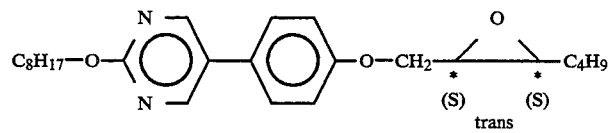

trans

By adding these dopants to the basic formulation, an FLC composition having the following formula (the contents being shown in mol %) is obtained:

| Basic formulation | 87.67 |
| --- | --- |
| Dopant D1 | 4.53 |
| Dopant D2 | 2.70 |
| Dopant D8 | 5.10 |

This composition experiences spontaneous polarization of 30 nC×cm$^{-2}$ at 25° C. and exhibits the phase transfer series of $S_C$*61$S_A$*69N*85I.

Figure 1C:
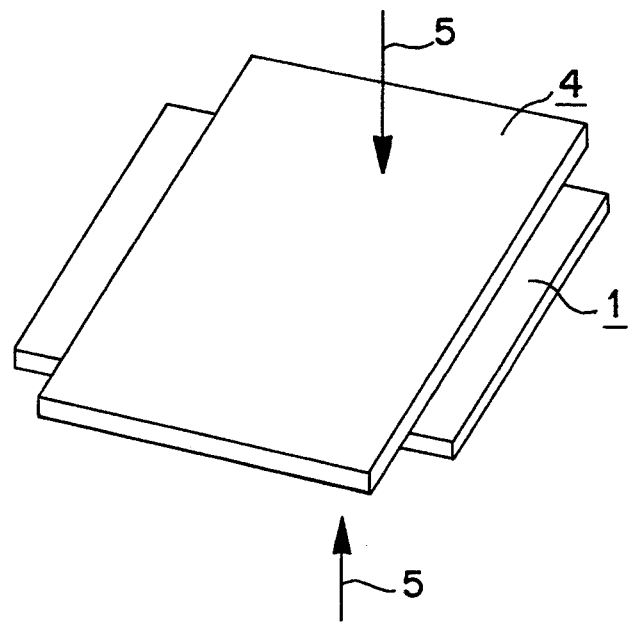

In the next step, the coated layer of the FLC composition is heated, during or after evacuation, up to the temperature at which the FLC composition exhibits an isotropic liquid or a nematic phase, whereby the coated layer of the composition is defoamed and rendered to have a homogeneous structure. Subsequently, as shown in FIG. 1c. the other electrode plate 4 which is neither printed with a sealant nor coated with a liquid crystal is placed either in vacuo or at atmospheric pressure in such a way that the side of said plate which has an electrode (not shown) faces the side of the electrode plate 1 that includes the coated layer of the defoamed FLC composition, and the two electrode plates are compressed together. By applying pressure 5 until the gap between the two plates reaches a desired value, a cell is fabricated. As the cell is compressed or after it has been compressed, an ultraviolet radiation or heat is applied to cure the sealant, whereby a complete liquid-crystal cell is produced. If thermal defoaming is found to be insufficient to provide a homogeneous structure in the coated layer of the FLC composition, the liquid-crystal cell may be re-heated up to the temperature at which the FLC composition exhibits an isotropic liquid or a nematic phase.

An example of the present invention is described below.

EXAMPLE

ITO transparent electrode and polymide orientation membrance were placed on a glass plate. An ultraviolet-curable epoxy resin (Hoechst AG, Epoxy Resin Beckopox) was applied on the periphery of the orientation membrance by using screen printing at a thickness of 10μ without installing an opening for injection of FLC. FLC composition (V) incorporating a spacer (SiO$_2$ as true spherical beads of 2 μm in diameter) in an amount of 3 wt % of the total composition was coated on the portion surrounded by the epoxy resin (sealing portion) by using a roll coater at a thickness of 2μ. The electrode plate thus treated and the other electrode plate not having a coating of sealing agent and an FLC coating, were charged into a vacuum chamber, which was evacuated to 10$^{-2}$ Torr. The two electrode plates were heated at 90°-100° C. in vacuum to defoam the FLC composition. Air in the FLC composition was completely removed in 10 minutes. The two electrode plates were compressed together by a pressing means provided in the vacuum chamber so that the gap between the two electrode plates decreased to 2μ, and then the sealing agent was cured by exposure to ultraviolet radiation while compressing the plates, whereby the liquid-crystal cell of the present invention was fabricated.

We claim:

1. A process for producing a liquid-crystal cell which comprises the steps of:
   (a) providing a curable sealant portion in the periphey of the side of an electrode plate that has an electrode or electrodes;
   (b)
      (i) coating a ferroelectric liquid-crystal composition on the portion surrounded by said sealant portion, with a spacer being preliminarily provided in said portion; or
      (ii) coating a spacer-containing ferroelectric liquid-crystal composition on the portion surrounded by said sealant portion; or
      (iii) coating a ferroelectric liquid-crystal composition on the portion surrounded by said sealant portion and thereafter providing a spacer over said composition;
   (c) defoaming the coated layer of the liquid-crystal composition by heating the coated plate during or after evacuation up to the temperature at which the liquid-crystal composition exhibits an isotropic liquid or nematic phase;
   (d) placing the other electrode plate in such a way that the side of said other electrode plate which has an electrode or electrodes faces the side of said one electrode plate containing the thermally defoamed coated layer of the liquid-crystal composition and compressing the two electrode plates together; and
   (e) curing said sealant.

2. A process according to claim 1 which further includes the step of heating the liquid-crystal cell after step (e).

* * * * *